United States Patent [19]

Chang et al.

[11] Patent Number: 4,954,151
[45] Date of Patent: Sep. 4, 1990

[54] METHOD AND MEANS FOR OPTIMIZING BATCH CRYSTALLIZATION FOR PURIFYING WATER

[75] Inventors: Chung-Nan Chang, Los Altos; William M. Conlon, Palo Alto; Donald M. Hendricks, Moraga, all of Calif.

[73] Assignee: Polar Spring Corporation, Menlo Park, Calif.

[21] Appl. No.: 295,651

[22] Filed: Jan. 10, 1989

[51] Int. Cl.$^5$ ............................................. B01D 9/04
[52] U.S. Cl. .................................... 62/532; 62/124
[58] Field of Search .................................. 62/532, 124

[56] References Cited

U.S. PATENT DOCUMENTS

3,338,065  8/1967  Ashley ................................. 62/532
3,630,042  12/1971  Petsinger ............................. 62/532

Primary Examiner—Ronald C. Capossela
Attorney, Agent, or Firm—A. C. Smith

[57] ABSTRACT

An improved water purification apparatus and method includes the freeze plate of a refrigeration system disposed in contact with the surface of water to be purified for transferring heat from the water substantially only through the surface and for forming a layer of ice only near the surface that is nearly as thick as the volume of water is deep. Electrostatic field is produced to improve the rejection of impurities at the ice-water interface. System and operating parameters are described for the optimum production of purified water through recurring cycles of freezing, draining, melting, and recovering melt water in batch processing of impure water using a refrigeration system of selected heat-removing capacity.

51 Claims, 7 Drawing Sheets

Keys:
Control signal — — —▶   Water Flow ▬▶   Refrigerant Flow ▪▪▪▪▪▶

METHOD AND MEANS FOR OPTIMIZING BATCH CRYSTALLIZATION FOR PURIFYING WATER

RELATED APPLICATION

This application relates to the subject matter of pending applications Ser. No. 114,232, entitled "DUAL FREEZING CHAMBER SYSTEM AND METHOD FOR WATER PURIFICATION", filed on Oct. 27, 1987 by C. N. Chang, now U.S. Pat. No. 4,799,945, which subject matter is incorporated herein by reference.

BACKGROUND OF THE INVENTION

This invention relates to batch purification of water by freezing the water into ice and by melting the ice, and more particularly to the method and means for optimizing the operating parameters, including the surface area of the evaporator, the freezing time, the thickness of ice, the depth of the batch volume of water to be purified, the volumetric capacity, the cost per gallon, and the like.

Certain known water purification systems use freeze chambers and dynamic conditions to continuously form ice crystals in or from chilled water, and then to segregate the ice crystals from the chilled water for separate processing. The relationships between the evaporation temperature of the refrigerant, the temperature and effective area of the freeze plate, the compressor capacity, thermal conduction coefficient of ice, and the like, were not explored for optimum conditions in such systems.

In these conventional systems, the quantity of water purified by the process (i.e., volumetric capacity) was considered to be related to the compressor capacity, or to the refrigerant evaporation temperature, or to the thermal conductivity of ice, without appropriate consideration given to optimizing the operating efficiency of the system.

SUMMARY OF THE INVENTION

In accordance with the present invention, optimum configurations are set forth for a single- or multiple-chamber batch purification system operating on the freeze crystallization of water and the melting of the resulting ice. The optimum operating conditions established according to the present invention consider the surface area and temperature of the freeze plate, the freeze and melt times, the thickness of ice layer, the depth of the volume of chilled water in which an ice layer is formed, and the like. The locus of optimum operating conditions is established for such variables as compressor capacity, and allowable freeze and melt times to define the operating conditions for a small, efficient batch-processing water purifier.

DESCRIPTION OF THE PREFERRED EMBODIMENT

In a typical batch-type crystallization purifier of water, for example, of the types described in the aforecited patent application, a volume of impure water is confined in a chamber wherein heat is extracted from the water, preferably at a boundary surface of the volume of water, in order to form a layer of ice in situ. The unfrozen portion of the volume of water with increased impurity concentration is then drained away and the layer of ice is then melted to yield a volume of purified water Successive operations through these cycles yield a daily volume of Purified water that is dependent upon several of the factors referred to above.

There is a significant relationship between the evaporation temperature of the refrigerant and the capacity of the compressor in a typical small reciprocating compressor of the type commonly employed in domestic refrigerators. Referring to the graph of FIG. 1, there is shown a chart of the heat-removing capacity (in BTU'S per hour) as a function of the evaporation temperature of the refrigerant. As the chart illustrates, the heat-removing capacity of a given-size compressor decreases as the refrigerant temperature decreases. It is therefore desirable to operate at a refrigerant temperature for which the heat-removing capacity is greater, consistent with optimum ice-volume formation in allowable freezing time.

Figure 2:
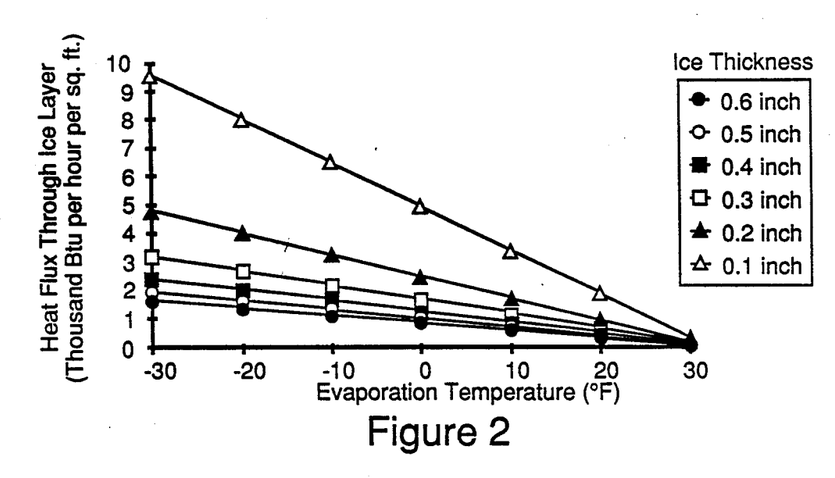
FIG. 2 is a graph illustrating the heat flux through a layer of ice as a function of the refrigerant evaporation temperature.

Referring therefore to the graph of FIG. 2, there is shown a chart including a family of curves illustrating the rate of heat flux through layers of ice of various thicknesses for various refrigerant evaporation temperatures. The heat flux through a layer of ice is generally proportional to the temperature difference across the layer of ice, and is inversely proportional to the thickness of the layer of ice, substantially in accordance with the following equation:

$$q = k(T_{cold} - T_{water}) \div \Delta x \qquad \text{(Eq. 1)}$$

where:

q = heat flux (in BTU'S per hour per square foot)

k = thermal conductivity coefficient of ice (approximately 1.28 BTU/sq. ft.—hr.—F°)

T cold = Temperature of coldest surface (approximately refrigerant evaporation temperature)

T water = temperature at ice/water interface (32° F.)

Δx = ice layer thickness

Thus, considering that the refrigerant circulates through a freeze plate (or cold plate) of excellent thermal conductivity, the difference between the temperature of the refrigerant and the surface of the freeze plate is negligible. Therefore, the heat flux through a layer of ice is illustrated in FIG. 2 plotted as a function of refrigerant evaporation temperature for various thicknesses of ice. From the chart of FIG. 2, it should be noted that heat flux through a layer of ice is highest for the thinnest layer and lowest for the thickest layer. Stated differently, it should be noted that the heat flux through the layer of ice diminishes as the layer thickens, thus leading to reduced build-up of ice volume per unit time for given compressor operating conditions.

Since a compressor has a given heat-pumping capacity (which depends upon the refrigerant evaporation temperature), and upon the thickness of the ice layer, then the surface area of the freeze plate through which the refrigerant circulates must be selected as a function of the compressor capacity.

Figure 3:
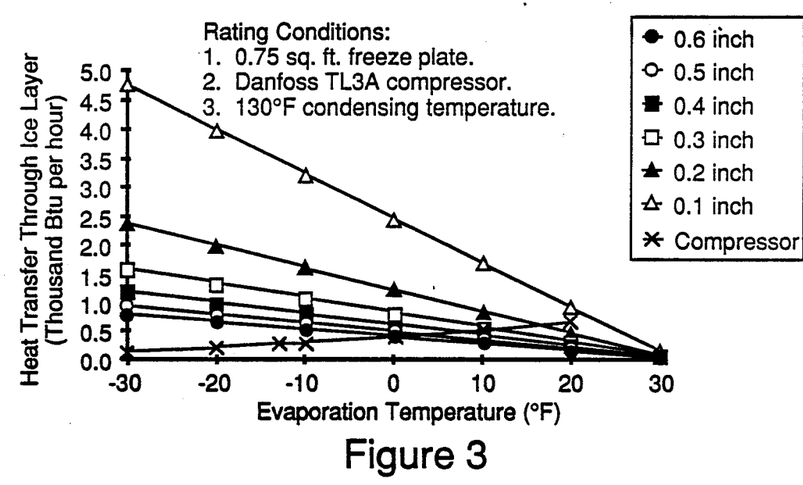
FIG. 3 is a graph illustrating the rate of heat flux through layers of ice of various thickness as a function of refrigerant evaporation temperature, and including a plot of compressor capacity in the family of curves.

Referring to the graph of FIG. 3, there is shown a chart of heat flux through ice layers of various thicknesses as a function of refrigerant evaporation temperature, with the plot of compressor capacity for a given unit included in the illustrated family of curves. It should be noted from this chart that, at 0° F. evaporation temperature, the given compressor unit does not have enough capacity to remove all of the heat that can be transferred through a layer of ice until it attains a thickness of about 0.6 inches. Thus, during initial operation, the rate of growth of the ice layer is limited by the heat-removal capacity of the compressor, and not by the rate at which heat can diffuse through the layer of ice. During this initial operation, the average temperature of the freeze plate is considered not to be as low as the refrigerant evaporation temperature, even though the evaporation temperature is held substantially constant by such physical aspects of the system as the length of the conventional capillary tube, and the like. Therefore, it should be noted that for a practical system of the type described, there will be an initial operating period during which the compressor has insufficient capacity to remove the heat from water to be crystallized as rapidly as possible because the ice layer thus formed is initially very thin (i.e., very thermally conductive). Alternatively, furnishing an excessively-large compressor (or a freeze plate of excessively small surface area) is undesirable because the compressor would cycle on and off more frequently, and ice would form too rapidly to permit diffusion of impurities away from the ice-water interface, with concomitant lower purity of water from the melting of such ice. Also, it is desirable to provide a freeze plate which exhibits an average temperature across the surface thereof that is substantially uniform (although perhaps not as low as the evaporation temperature of the refrigerant circulating therein) to promote uniform formation and growth of the ice layer. Such uniformity is important to assure high average purity of crystals throughout the layer of ice thus formed. Also, the freeze plate configuration of optimum area for forming and growing a volume of ice in a layer is preferred, for example, over a freeze plate configuration of smaller area for forming and growing a comparable volume of ice in a thicker, smaller layer. This is because the height of the ice-growing apparatus (as well as ice-formation times) increase with decreasing surface area of the freeze plate.

It should be noted that in batch-processing of impure water, only a portion of a volume of water is frozen and the remaining portion, containing substantially all the excluded impurities, is discarded. Therefore, it is desirable to limit the initial volume of impure water to an optimally-small volume to avoid substantial inefficiencies associated with having to remove heat from a larger volume of water that is then discarded. For a freeze-plate configuration of selected surface area, it is desirable to confine the volume of impure water within boundaries of substantially the same surface dimensions as the freeze plate and to a depth in the range of approximately 1.1 to 3 times the expected thickness of the ice layer to be formed therein.

Therefore, the principal aspects for optimizing throughput in a batch purifier, once a compressor of given heat-removing capacity is selected, include: allowable freeze time; the refrigerant evaporation temperature; the freeze-plate surface area; volume of discarded water: and allowable melt time.

Figure 4:
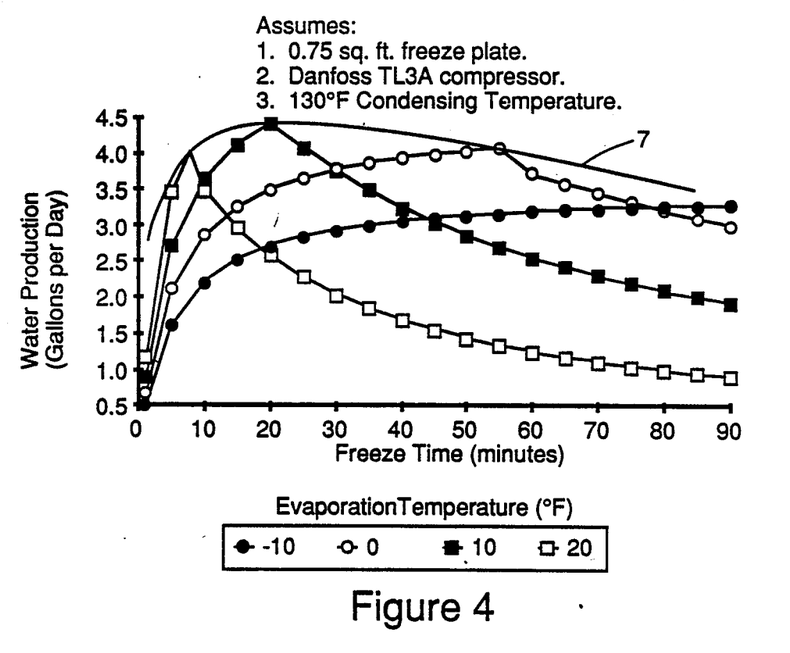
FIG. 4 is a graph illustrating water production as a function of freeze time for various evaporation temperatures.

Freeze time is the period of time for formation of the layer of ice of desired thickness and, as illustrated in the graph of FIG. 4, there is an optimum time period for the reasons discussed above beyond which the throughput of purified water decreases. The chart of FIG. 4 illustrates water production as a function of freeze time for various evaporation temperatures attainable with a given compressor unit. For a given compressor unit and a given evaporation temperature, there usually exist two distinct phases of ice formation, namely: (a) ice formation limited initially by compressor capacity; and (b) ice formation limited subsequently by the rate of thermal conduction through the ice layer. In terms of throughput of purified water, these phases are bounded by a distinct maximum point at an optimal freeze time, as illustrated in the graph of FIG. 4. As the evaporation temperature is decreased, the optimal freeze time increases and the maximum becomes less pronounced, as illustrated in the graph of FIG. 4. This graph also illustrates that there is a locus of maximum throughput conditions which itself has a maximum value (at approximately 30 minutes freeze time and at approximately 5° F. evaporation temperature for the operating parameters specified in the Figure). Freeze times up to approximately 60 minutes, for the operating conditions specified in the graph, thus yield acceptable levels of throughput within tolerable percentages of the maximum possible throughput.

Figure 5:
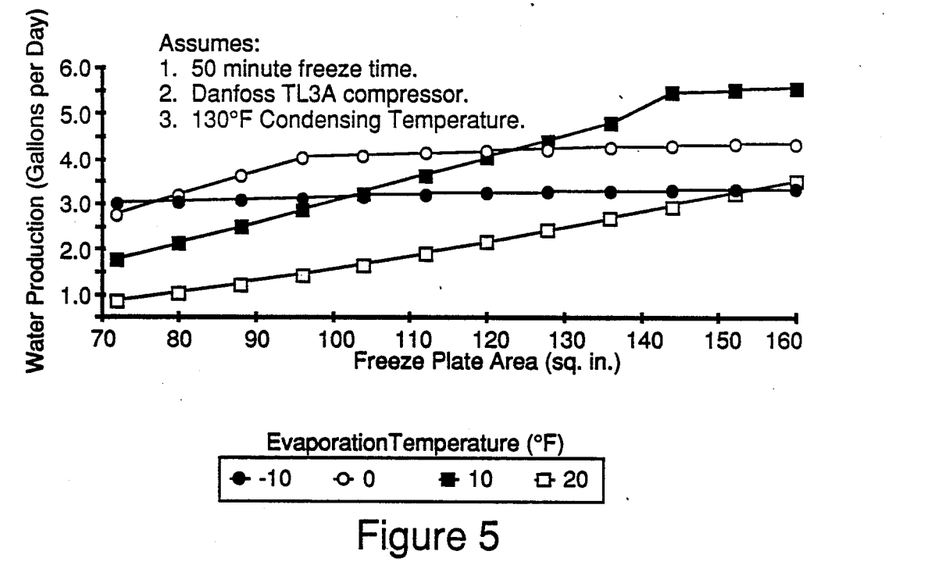
FIG. 5 is a graph illustrating throughput capacity for freeze plates of various sizes.

It should be noted, therefore, that for any given compressor and evaporation temperature, certain freeze times may be tolerated, and throughput will be optimized for a selected area of the freeze plate, as illustrated in the graph of FIG. 5. This Figure illustrates that for a given allowable freeze time, the water production increases as the freeze plate area increases (i.e., larger volumes of ice produced per freeze cycle), until a critical area is reached at which further increase in area produces little additional increase in throughput. The sloped portions of the curves are believed to correspond to the periods during which ice growth is limited by compressor capacity, while the substantially horizontal portions of the curves (i.e., saturation) are believed to be attributable to the limited thermal diffusion rate of heat through an ice layer. Therefore, since the cost of a freeze plate and associated refrigeration equipment increases with increases in the surface area of the plate, it should be noted that no substantial throughput benefit is realized by increasing the freeze plate area beyond an optimal size (i.e., beyond about 100 square inches in the illustrated example).

Figure 1:
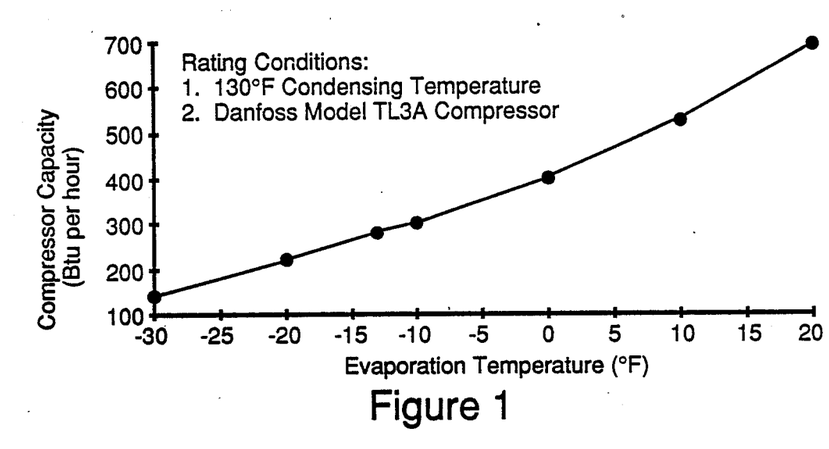
FIG. 1 is a graph illustrating the heat-removing capacity of a given compressor as a function of the refrigerant evaporation temperature.
Figure 7:
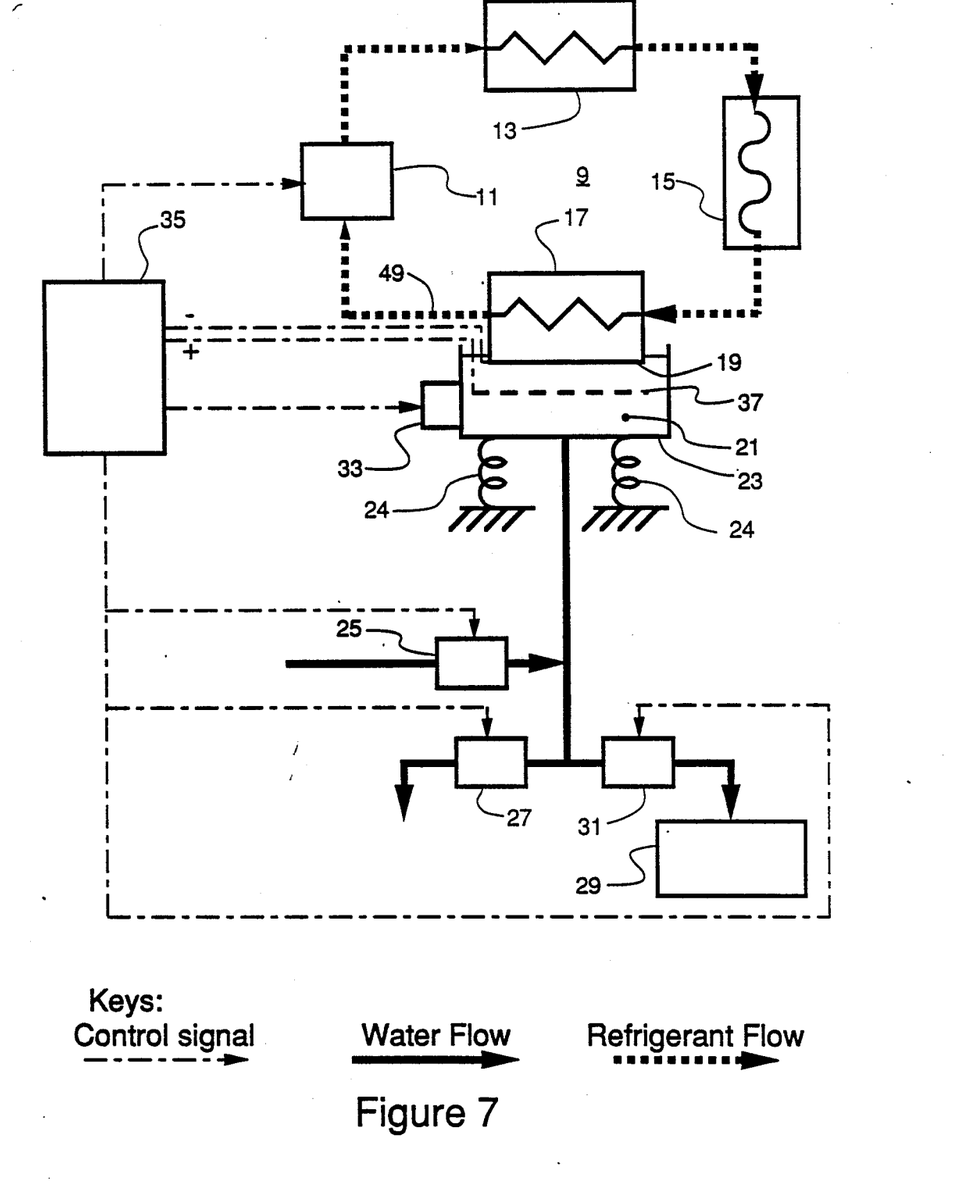
FIG. 7 is a block schematic diagram of one embodiment of the present invention.

For a given-size compressor, the capability of handling the cooling load increases with the evaporative temperature, as illustrated in FIG. 1. However, once the expansion valve or capillary tube (for example, 15 of FIG. 7) is selected, the evaporative temperature and cooling load of the refrigerant are fixed. Thus, at the beginning of the ice forming process, a thin ice layer is formed and heat transfers through the ice layer very rapidly. This is because:

$$Q_{tr}=k(T_w-T_f)/1 \qquad \text{(Eq. 2)}$$

where $Q_{tr}$ is the amount of heat transferred from the water to the freeze plate 19 and the refrigerant circulating therein; k is heat conductivity of ice; $T_w$ is the freezing point temperature (32° F. at normal condition); T, is the average temperature of the freezing plate; and 1 is the ice layer thickness. Since $Q_{tr}$ can not exceed the maximum value of a selected design and $T_w$ is a constant for most cases, $T_f$ must initially be closer to $T_w$ when 1 is small. Subsequently, however, when the ice layer is thick enough, $Q_{tr}$ must be lowered because $T_f$ reaches the minimum temperature $T_{ev}$ which the selected refrigeration system can achieve. As a result of the above two distinct phenomena, it is believed that there must exist a critical ice thickness $1_{cr}$ for which the $(Q_{tr})$max matches with $T_f=T_{ev}$.

The importance of this critical thickness, $1_{cr}$, is that:
1. If 1 is less than $1_{cr}$, then more frequent cycling of operations is necessary and the burden of time required for filling, freezing, melting, and draining increase proportionally and productivity suffers.
2. If 1 is greater than $1_{cr}$, then $Q_{tr}$ reduces rapidly through ice of thickness 1 greater than $1_{cr}$, and productivity suffers.

Therefore, it is important to limit the thickness of ice to around $1_{cr}$ for maximum yield. The following equation sets forth the parameters for $1_{cr}$:

$$(Q_{tr}/A)\text{max}-k(T_w-T_{ev})/1_{cr} \qquad \text{(Eq. 3)}$$

or $$1_{cr}=k(T_w-T_{ev})/(Q_{tr}/A)\text{max} \qquad \text{(Eq. 4)}$$

As an example, for a typical vapor compressor, (Danfoss Model TL3A), $(Q_{tr})$max is 525 BTU/hr at $T_{ev}=10°$ F., k is 1.28 BTU/ft/hr/° F. and A is 96 in²; and the critical thickness becomes 0.429 inches. However, for $T_{ev}=-10°$ F., $1_{cr}$ becomes 1.433 inches. Therefore, the peak 7 illustrated in FIG. 4 is practically determined as the point of critical thickness $1_{cr}$ for which the filling, freezing, melting, and draining times, and appropriate heat losses, yield maximum production of purified water.

Figure 6:
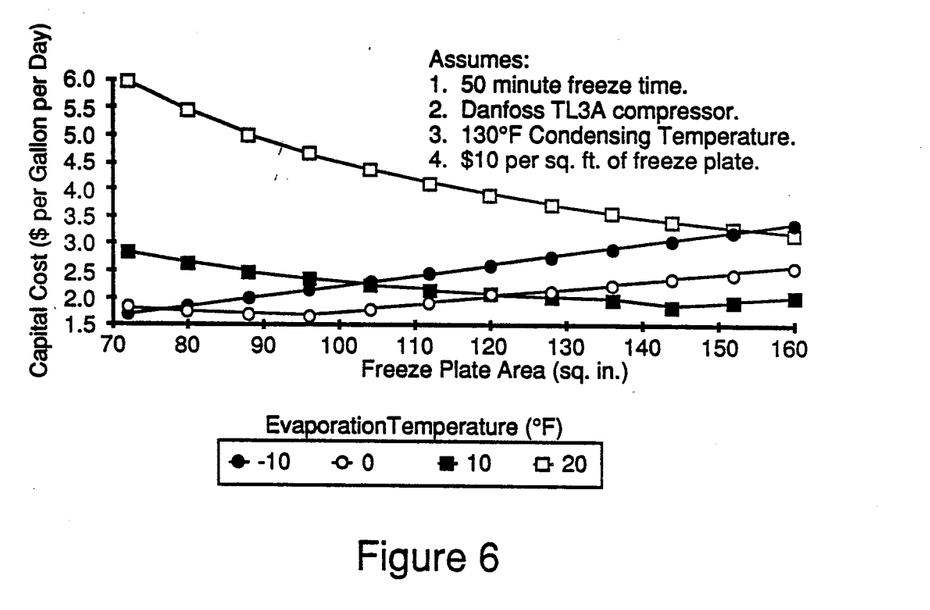
FIG. 6 is a graph illustrating optimum cost considerations for throughput from freezer plates of various sizes.

The capital costs involved for throughput capacity may be optimized (i.e., at lowest cost per gallon per day), as illustrated in FIG. 6, by considering the cost of the major component (i.e., the freeze plate) at, say, $10.00 per square foot of surface area, and by considering the production rates as a function of freeze plate area as illustrated in FIG. 5. It should be noted that a point of minimum cost per gallon per day can be attained with a freeze plate of about 96 square inches (i.e., approximately ⅔ square foot), operating with refrigerant evaporation temperature at about 0° F.

Referring now to FIG. 7, there is shown a block schematic diagram of one embodiment of the present invention. Specifically, there is shown a compressor 11 which operates in a closed system 9 to circulate refrigerant through condenser 13 and expander 15 to the evaporator 17 including freeze plate 19, and then back to the compressor 11, all in conventional manner. Vaporization of the refrigerant within the evaporator 17 absorbs heat through the freeze plate 19 from water (and ice) 21 in the water vessel 23, and the refrigerant temperature is essentially established by the expander 15 which may include a conventional capillary or expansion valve.

The water transfer system in the illustrated embodiment of the present invention includes the vessel 21 to which the feed water that is to be purified is supplied via the feedwater valve 25. In addition, the quantity of unfrozen waste water remaining in the vessel 23 after the requisite volume of ice is formed about the freeze plate 19 (and containing a higher concentration of residual impurities than the feedwater) is drained from the vessel via waste water drain valve 27. Also, purified water which collects in vessel 23 as the volume of ice about freeze plate 19 is melted is drained away to storage 29 (or to direct consumption) via the purified water valve 21. A heater 33 may be disposed in contact with freeze plate 19 and/or with one or more of the boundary walls of vessel 23 to facilitate the rapid melting of the volume of ice formed about the freeze plate 19. The heater 33 may be an electrical heater, or the condenser of a refrigerant system operating in alternating time relationships with the freeze-cycle operation of system 9. For example, heater 33 may include the condenser of another system for purifying water within another vessel (not shown), and operating in similar manner in alternating timed relationships of the freezing and melting operations of such two systems. Of course, other types of heaters such as infra-red sources, microwave, or the like, may also be used as the heater 33. The compressor 11, heater 33 and valves 25, 27, and 31 are operated in timed sequence by the controller 35.

In operation, controller 35 activates the feedwater valve 25 to supply a quantity of water to be purified to vessel 23. The vessel is shaped closely approximate to the horizontal surface of the freeze plate 19 with a depth below the freeze plate 19 of approximately 1.1 to 3.0 times the expected thickness of a layer of ice beneath the freeze plate 19. The vessel 23 may be mounted to respond to weight of water to turn off the feedwater valve 25, and the evaporator 17 with freeze plate 19 may be resiliently mounted to accommodate expansion of ice within the confines of vessel 23, as well as to provide resilient bias of the ice layer against the freeze plate 19 to promote efficient heat transfer from the heater in the freeze plate 19 (when in operation) to the ice layer resiliently urged into contact therewith. The compressor 11 is activated by controller 35 to freeze the water in vessel 23 for a selected period of time, or until a selected volume of ice is formed about the freeze plate 19.

The freeze time is the time from the first formation of ice at the surface of the freeze plate (or freeze cylinder in the case of a cylindrical vessel 23) until the compressor 11 is turned off, as determined by the controller 35. (The compressor 11 must also operate for a period of time to remove heat from the water before freezing begins). For freeze crystallization apparatus operating at the nominal conditions described above (130° F. condensing temperature, 60° F. feedwater temperature), the total freeze time can be determined from the parameters of the system, as previously described. However, if a change in ambient temperature causes the condensing temperature to change, the compressor 11 capacity will change and the freeze time must be adjusted by the controller 35 to maintain the optimal throughput at the different ambient condition.

Several methods of adjusting the freeze time can be used, as follows:

1. Measure the ambient temperature and use a lookup table and interpolation function to predict the adjusted freeze time as a function of the measured ambient temperature;
2. Measure the initial feedwater temperature and the rate of change of feedwater temperature to determine the adjusted freeze time based on heat transfer considerations;
3. Measure the time from compressor starting to the formation of ice on the freeze plate, and adjust the freeze time in proportion to the ratio of the measured time to the nominal time required.

Of course, the evaporation temperature is determined by the pressure drop induced by the flow of refrigerant through the expander 15 which may be either a fixed capillary tube or an expansion valve subject to control by controller 35. The freeze plate area 19, determined by the size of the evaporator 17, may be in the form of a plate located at the upper surface of the water 21 in the vessel 23, or in the form of a cylindrical vessel 23 with the freeze plate 19 forming the cylindrical walls.

The recovery ratio is the ratio of the volume of purified water produced compared to the volume of feedwater required. The recovery ratio is determined by adjusting the volume of the vessel 23, either by changing the depth or by increasing the diameter of a cylindrical vessel. Thus, the ice crystal layer is grown vertically downward into the tray or vessel of water 21. A freeze plate 19 of a given surface area is in contact with the upper horizontal surface of the water and removes heat through the surface of the water 21 and through a horizontal ice-crystal layer that forms about the freeze plate 19. An alternate geometric configuration is a cylindrical vessel (for example of circular or rectangular cross-section) in which the ice-crystal layer is grown horizontally inward toward the center, with heat removal through the vertical sides of such cylinder. There, the impurities are concentrated in a column of water in the center of the cylinder (or beneath the plate 19) and are selectively drained via the wastewater drain valve 27 with the excess, impure water 21 that is not frozen then drained from the vessel 23 by activating valve 27 under control of controller 35. Thereafter, the heater 33 is activated to melt the volume of ice about the freeze plate 19. With valves 25 and 27 closed, the purified melt water is drained away to storage 29 through valve 31 that is activated by controller 35. Thereafter, with valves 27 and 31 closed, the feedwater valve 25 is activated to supply impure water to be purified 21 to the vessel 23 for operation through another freeze purification cycle, as previously described.

As illustrated in FIGS. 4, 5 and 6, the optimal thickness of ice layer is critical to obtaining the optimal purity and throughput of purified water, and occurs when the heat removed by the refrigeration system through the freeze plate is balanced by the heat that can be transferred through the ice layer. In mathematical terms, this is given by:

$$q_{opt} = [k \cdot A \cdot \Delta T \div \Delta x]_{opt} \qquad \text{(Eq. 5)}$$

The left hand side of equation 5 represents the compressor heat removal capacity (which is a function of evaporation temperature), while the right hand side of the equation represents the heat transfer through an ice layer of thickness $\Delta x$ and cross-sectional area A. This equation can be re-arranged in dimensionless groups as follows:

$$(\Delta x \div \sqrt{A})_{opt} = [k \cdot \sqrt{A} \cdot \Delta T \div q]_{opt} \qquad \text{(Eq. 6)}$$

The same principal can be applied to geometries other than the horizontal freeze plate, for example, in cylindrical geometry, the equivalent heat balance is:

$$q_{opt} = [2\pi \cdot k \cdot l \cdot \Delta T \div ln(r_0 \div r_1)]_{opt} \qquad \text{(Eq. 7)}$$

where,
l is the length of the cylinder,
$r_0$ is the outside radius of the cylinder,
$r_1$ is the inside radius of the ice.

Re-arranging this equation in dimensionless groups gives:

$$(r_0 \div r_1)_{opt} = exp[2\pi \cdot k \cdot l \cdot \Delta T \div q]_{opt} \qquad \text{(Eq. 8)}$$

If the ice thickness is again represented by $\Delta x$, then $r_1 = r_0 - \Delta x$, and the optimal non-dimensional ice thickness in cylindrical geometry is given by $$(\Delta x \div r_0)_{opt} = 1 - exp[-2\pi \cdot k \cdot l \cdot \Delta T \div q]_{opt} \qquad \text{(Eq. 9)}$$

The volumetric capacity of a freeze crystallization apparatus according to the present invention is equal to the volume of purified water produced in a batch divided by the cycle time required to prepare the batch. The volume of water produced in a batch is $$Q_{batch} = \Delta x \cdot A \cdot [p_s \div p_f] \div [\theta_s + \theta_f + \theta_m \theta_o] \qquad \text{(Eq. 10)}$$

where,
$\Delta x$ is the ice thickness described above,
A is the area of the freeze plate,
$p_s$ is the density of the ice, and
$p_f$ is the density of the water The cycle time includes the following components:
$\theta_s$ the time required to remove heat from the water,
$\theta_f$ the time required to freeze the ice,
$\theta_m$ the time required to melt the ice,
$\theta_o$ the time required for overhead, e.g., filling and draining the apparatus.

Since the entire batch must be cooled from the incoming feedwater temperature to the freezing point, then $\theta_s$ is, $$\theta_s = p_f \cdot A \cdot D \cdot \Delta T_{fw} \cdot C_p \div q \qquad \text{(Eq. 11)}$$

where
D is the depth of the freeze tray, $\Delta T_{fw}$ is the difference between the feedwater temperature and the freezing temperature,
$C_p$ is the specific heat of the water to be purified,
q is the compressor heat removal capacity,
$p_f$ is the density of water The time required to freeze the purified water is $$\theta_f = p_s \cdot A \cdot \Delta x \cdot h_{fs} \div q \qquad (Eq. 12)$$

where,
$h_{fs}$ is the latent heat of fusion of the ice.

The time required to melt the purified ice is:

$$\theta_m = p_s \cdot A \cdot \Delta x \cdot h_{fs} \div q_{melt} \qquad (Eq. 13)$$

where,
$q_{melt}$ is the heat addition capacity of the melting device.

The overhead time, $\theta_o$, includes the time to fill the apparatus, the time to drain the impure water from the freeze tray, and the time to drain the purified, melted ice from the freeze tray. These times should be proportional to the volume of fluid to be filled or drained, as well as to the pressure difference between the source of the water and the tray (for filling) or between the tray and the drain location. For a typical horizontal freeze tray application, however, the drainage flow rate is quite slow, and the overhead time is therefore considered to be a constant. In most cases of practical significance, the overhead time is insignificant compared to the other times.

Thus the volumetric capacity of the device is:

$$Q = \Delta x \cdot A \cdot [p_s \div p_f] \div \{[p_f \cdot A \cdot D \cdot \Delta T_{fw} \cdot C_p \div q] + \qquad (Eq. 14)$$
$$[p_s \cdot A \cdot \Delta x \cdot h_{fs} \div q] + [p_s \cdot A \cdot \Delta x \cdot h_{fs} \div q_{melt}]\}$$

This can be re-arranged in dimensionless groups as follows:

$$Q \cdot p_f h_{fs} \div q = \{[D \cdot p_f \Delta T_{fw} C_p \div (\Delta x \cdot p_s \cdot h_{fs})] + 1 + [q \div q_{melt}]\}^{-1} \qquad (Eq. 15)$$

This expression can be simplified by defining the recovery ratio R, previously discussed, as follows:

$$R = (p_f \div p_s) \cdot (D - \Delta X), \qquad (Eq. 16)$$

so that:

$$Q \cdot p_f h_{fs} \div q = \{[R \cdot \Delta T_{fw} \cdot C_p \div h_{fs}] + 1 + [q \div q_{melt}]\}^{-1} \qquad (Eq. 17)$$

The first term on the right hand side of equation 17 shows the influence of feedwater temperature and recovery ratio on the volumetric capacity, and the last term shows the influence of melt heater capacity. In the case of cylindrical geometry, the same equation above can be applied by defining the recovery ratio for cylindrical geometry to be:

$$R = (p_f \div p_s) \cdot [1 - (r_1 \div r_o)^2], \text{ or } (p_f \div p_s) \cdot \{1 - [1 - (\Delta x \div r_o)^2]\} \qquad (Eq. 18)$$

From the preceeding description, it should be noted that as the ice layer grows thicker, the rate of production decreases, so if the ice is permitted to grow too thick in a batch, the daily production of purified water is decreased. Also, for a given depth of water in the vessel 23, as the ice layer grows thicker, the concentration of impurities in the liquid 21 increases with higher probability of entrapment of impurities in the ice layer that results in relatively greater contamination of the melt water.

Since it is difficult or expensive to directly measure the thickness of the ice layer in situ during a batch, an indirect means of determining the optimal ice thickness is preferred. In one embodiment of the present invention a timer is included in controller 35, and the optimal operation time can be directly determined in accordance with the above-described method and apparatus. Unfortunately, the optimal freeze time is dependent upon ambient conditions such as the feedwater temperature, and the ambient temperature (which influences the heat pump capacity). In addition, the matching of the capacity of the heat pump to the freeze plate area can be influenced by various manufacturing tolerances in the components of the system, as well as by aging or deterioration.

In an alternative embodiment of the present invention, simple method and apparatus are provided to compensate for these ambient variations to assure that the batch crystallization purification operates optimally. Also, an economical scheme is provided for controlling the optimal operation under the influence of the variations described above. Thus, with reference to Equations 11 and 12, above, the batch cycle time can be determined by thermodynamic calculations that include the heat gain of the apparatus from the ambient environment, the incoming feedwater temperature, and the capacity of the heat pump at the ambient temperature. Since the ambient temperature and feedwater temperature can vary in actual applications, a timer may not be sufficient to assure optimal thickness of the ice. Moreover, the time for optimal ice thickness predicted by the above equations may not apply exactly to production apparatus subject to manufacturing tolerances, or may not apply to situations in which the performance in an actual environment differs from the performance in the ideal environment.

In an alternative embodiment, a temperature measuring device is used to measure the rate of change of temperature of the water as it is cooled prior to freezing, and from this measurement the capacity of the heat pump can be determined. Thus, if the temperature of the water is decreased from an initial temperature $T_0$ to a final temperature $T_1$, that is by an amount $\Delta T_1$, over a period of time measured as $\theta_1$, then an estimate of the actual heat pump capacity can be determined as:

$$\hat{q} = p_f \cdot A \cdot D \cdot C_p \cdot \Delta T_1 \div \theta_1 \qquad (Eq. 19)$$

where,
$\hat{q}$ is the estimated heat pump capacity in watts;
$T_1$ is the measured temPerature change of the water $= T_0 - T_1$ in °K; and
$\theta_1$ is the measured time in seconds.

The freeze time given by equation (12) is also dependent on the heat pump or compressor capacity. Substituting equation (19) into equation (12) gives:

$$\theta_f = p_s \cdot \Delta x \cdot h_{fs} \cdot \theta_1 \div [p_f \cdot D \cdot C_p \cdot \Delta T_1] \qquad (Eq. 20)$$

From equation (3) above, the optimal ice thickness for the apparatus with the actual compressor capacity is:

$$\Delta x = k \cdot A \cdot \Delta T \div \hat{q} \qquad (Eq. 21)$$

Substituting equation (19) into equation (21) yields:

$$\Delta x = k \cdot \Delta T \cdot \theta_1 \div [p_f D \cdot C_p \cdot \Delta T_1] \quad \text{(Eq. 22)}$$

Now substituting equation (22) into equation (20) gives the freeze time as:

$$\theta_f = \{[p_s \cdot k \cdot \Delta T \cdot h_{fs}] \div [p_f D \cdot C_p \cdot \Delta T_1]^2\} \theta_1^2 \quad \text{(Eq. 23)}$$

Equation (23) shows that the freeze time is inversely proportional to the square of the measured rate of change of water temperature. In addition, equation (23) shows that the following parameters should be carefully controlled:

the depth, D, of the freeze tray;
the heat transfer temperature difference, $\Delta T$, which is determined by the length of capillary tube or expander 15;
the accuracy of the measurement of temperature difference, $\Delta T_1$;
the accuracy of the measurement of the time, $\theta_1$.

The length of time, $\theta_c$, required to operate the heat pump or compressor 11 to lower the water temperature from the temperature $T_1$ to the freezing temperature, $T_f$, can be obtained from a heat balance as, $$\theta_c = p_f A \cdot D \cdot C_p \cdot \Delta T_2 \div q \quad \text{(Eq. 24)}$$

where, $\theta_c$ is the additional time required to reach the freezing temperature in sec;
$\Delta T_2$ is the temperature difference $= T_1 - T_f$ in °K.

Substituting equation (19) into equation (24) gives, $$\theta_c = [p_f \Delta T_2] \div [p_f \Delta T_1] \cdot \theta_1 \quad \text{(Eq. 25)}$$

The total additional operating time of the heat pump is then the sum of $\theta_f$ plus $\theta_c$, and the time required to melt the purified ice layer is also proportional to the amount of ice present, as previously described.

Substituting equation (22) into equation (13) gives:

$$\theta_m = [p_s \cdot A \cdot K \cdot \Delta T \cdot h_{fs}] \div [q_{melt} p_f D \cdot C_p \cdot \Delta T_1] \theta_1 \quad \text{(Eq. 26)}$$

Equation (26) can then be used to control the time of operation of the melt heater 33.

Figure 9:
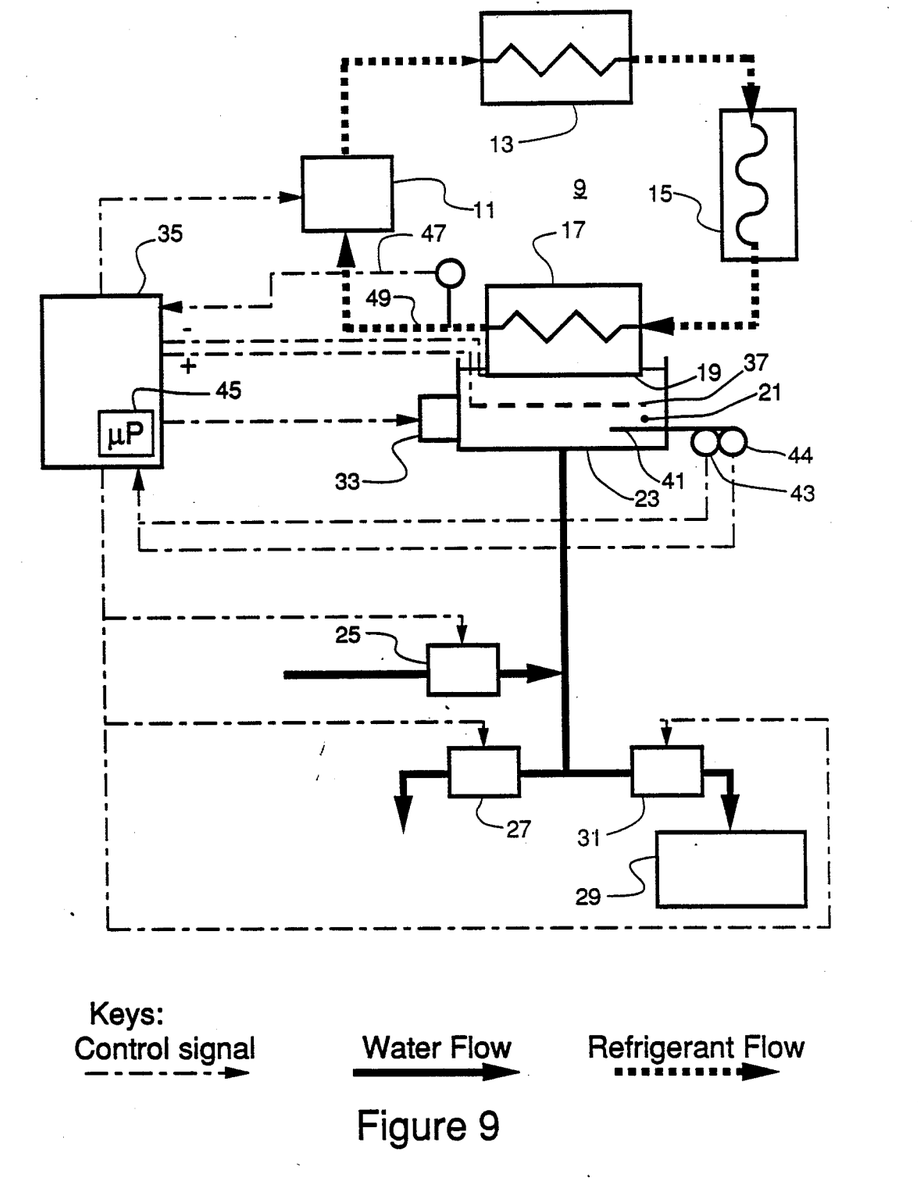
FIG. 9 is a block schematic diagram showing embodiments similar to the embodiment of FIG. 7 modified to include temperature-sensing controllers.

One modified embodiment of the present invention is illustrated schematically in FIG. 9 as including a temperature sensor 41 attached to or located in the vessel 23 in order to measure the feedwater temperature. The electrical signal from the temperature sensor 41 is sensed by two comparators 43 and 44 which each provide a logic signal to microprocessor 45 in controller 35. As the water temperature decreases below a certain temperature, the first comparator 43 changes its logic output, thereby signaling the microprocessor 45 to begin timing the cooling process. When the water temperature decreases further below a second temperature, the second comparator 44 changes its logic output, thereby signaling the microprocessor 45 to stop timing the cooling process. The elapsed time measured by the microprocessor 45 is the quantity $\theta_1$. The microprocessor then determines the additional time required for operation of the heat pump or compressor 11 in accordance with the equations (23) and (25), above. Likewise, the microprocessor 45 determines the time required for operation of the melt heater 33 in accordance with equation (26) above.

Another modified embodiment of the present invention, as illustrated in FIG. 9, operates on the two periods of ice growth previously discussed, including the first period in which ice growth is limited by the capacity of the heat pump or compressor 11, and the second period in which the ice growth is limited by the relatively poor thermal conduction of the ice layer. During the initial period in which the growth of ice is limited by the capacity of the compressor 11, the liquid refrigerant evaporates completely and is heated to a significant degree by conduction from the feedwater to the refrigerant before it returns to the compressor 11. During the latter period, the refrigerant boils and evaporates, but is not significantly heated due to poor thermal conduction of heat from the feedwater, through the ice layer, to the refrigerant. The temperature of the returning refrigerant can therefore be used to indicate the optimal ice thickness. A temperature sensing device 47 is mounted on or in the evaporator return line 49 to indicate the temperature of the evaporated refrigerant. When the temperature decreases below a given value, the optimal ice thickness has been attained.

In order to assure that all of the ice has been melted, a temperature sensing device may be located in the freeze tray. During the melting period of the cycle, such temperature sensor indicates by a rise in the sensed temperature that the ice is completely melted. If only a timer is used, the ice might either not melt completely, or too much time and energy might be used to melt the ice, resulting in higher operating costs as well as lower yield of purified water.

During each freeze purification cycle discussed above, ice crystals begin to grow at a nucleating site on or near the surface of the freeze plate 19 where water molecules become attached to each other through hydrogen bonding. The solution of impurities in water at the water/ice interface lose neighboring water molecules through crystal formation, and impurities originally immiscible or dissolved in water are rejected to the solution. The solution therefore becomes more concentrated with the rejected impurities. The concentration differential between the solution at the interface and the bulk liquid, is believed to drive impurities from the interface toward the bulk liquid through a diffusion process.

There are two ways that impurities can exist undesirably in the ice thus formed. The first way is by trapping of impurity-laden solution in the dislocation sites due to imperfect crystal growth. The second way is by replacing water molecules in the crystal lattice by impurity molecules.

Impurity introduction by the first way depends upon the diffusion and absorption rates. Specifically, from the principle of crystal growth, the slower the rate of crystal formation, the fewer the crystal dislocations. With a typical crystal growth, the crystal dislocations can be lower than 2%. Because ice growth is a relatively slow process compared with diffusion of impurities in water, the impurities in ice are not expected to exceed 4% of the original solution.

The second way of impurity introduction in ice is a direct result of hydrogen bonding. When a hydrogen atom bonds covalently to a very small, highly electronegative atom such as fluorine (F) or oxygen (O) or nitrogen (N), the resulting bond is highly polarized. The hydrogen atom has such a large positive partial charge, it is attracted to the negative center of an adjacent molecule with an appreciable intermolecular force. Since the electronegativity of oxygen is very large, only those ions with even higher electronegativity can replace it in the lattice. For example, among atoms only fluorine has higher electronegativity than oxygen, and among organic function groups, $NH_3$ and OH are slightly higher than oxygen. Therefore, sodium chloride, for example, exhibits a high rejection rate attributable to hydrogen bonding in crystal freeze purification. The aforementioned principles have been demonstrated experimentally with sodium chloride (NaCl) exhibiting 95% rejection. Similarly, lead nitrate ($P_bNO_3$) exhibited 97% rejection rate, while baking soda/water solution showed significantly less rejection compared with the above-described cases. Similarly, lower impurity rejection was exhibited for very hard water from wells. Recognizing the common dominating ionic impurity in both baking soda solution and in well water is bicarbonate ($HCO_3^-$), it is believed that bicarbonate must therefore have large electronegativity. Similar impurity rejection is also obtained from the softened well water where Sodium ions replace calcium or magnesium ions in the well water through the ionic exchange process of water softening. Such selective incorporation of negative ions in the ice lattice form an electrostatic potential at the ice/water interface, often as large as about 30 volts at the ice/solution interface of dilute electrolytic solutions.

In accordance with the present invention, an external negative voltage is applied between the freeze plate 19 and the conductive walls of vessel 23 (or a screen grid 37 in the water below the freeze plate 19) to push the negative ions away from the ice/water interface. The applied negative voltage is believed to create a double layer of ions, with positive ions being attracted to the ice/water interface and a layer of negative ions forming to maintain electric neutrality at the ice/water interface. With the positive ion layer as a buffer, the negative ions with high electronegativity can not easily be incorporated into the ice lattice, and the purity in ice is thus improved.

Figure 8:
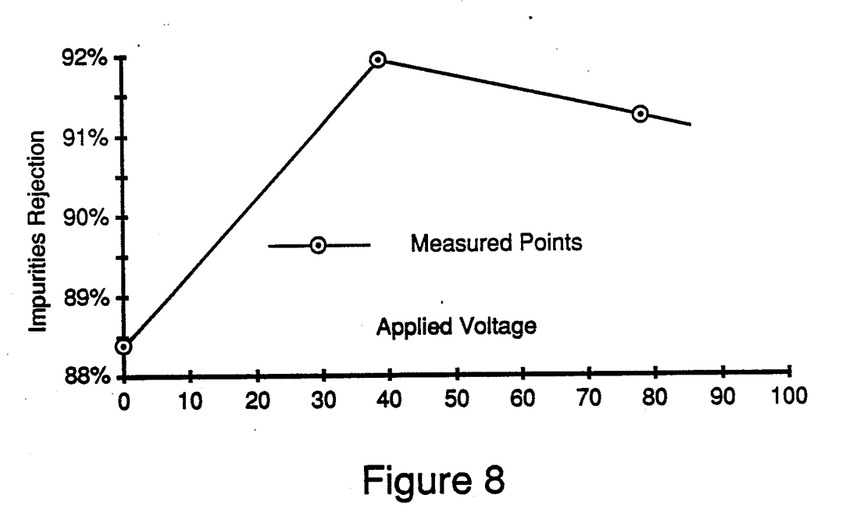
FIG. 8 is a graph illustrating impurity rejection enhancement as a function of applied voltage.

It should be noted that impurity rejection improves rapidly with increasing applied voltage, as illustrated in FIG. 8, until all the positive ions are exhausted at a critical field strength or value of applied voltage. Little enhancement is realized by further increasing the applied voltage beyond the critical voltage, as shown in FIG. 8. The critical voltage is thus determined by three fundamental effects: (a) differential absorption of the ice/water boundary; (b) differential incorporation; and (c) differential diffusion away from the ice/water boundary.

From the fundamental theory of electrolytic solutions, it can be shown that the developed voltage is the charge density of the incorporated ion divided by the double layer thickness, sometimes known as the Debye length. To a first-order approximation, the double layer thickness is proportional to the inverse of the square root of the ion density. Therefore, the voltage developed by the effect of Selective Incorporation of Ions (SII) in the ice-crystal lattice is proportional to the 3/2 power of the ion concentration of the relevant ionic species. The relevant ionic species are those with electronegativity higher than oxygen. For solutions without relevant ionic species, there is no voltage developed by SII, but this voltage increases rapidly with increasing relevant ionic concentration. The applied voltage therefore is set (or controlled by controller 35) to exceed the voltage developed by SII for the type and concentration of impurity ions expected to be encountered in the concentrated solutions 21 of impure water in vessel 23.

Figure 10:
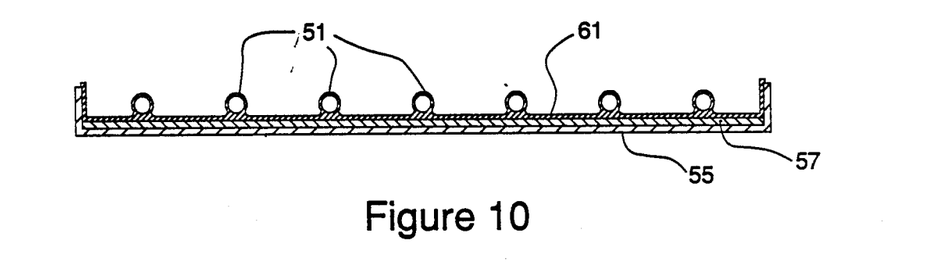
FIG. 10 is a sectional view of a freeze plate including heater apparatus according to the present invention.

Referring now to FIG. 10, there is shown a sectional view of a freeze plate 61 on which is deposited a heater structure that includes a layer of electrical conductor 57 and an adjacent insulating layer 55. This heater structure aids in optimizing the throughput of purified water in several ways. First, it should be noted that the typical internal structure of a freeze plate includes a plurality of tubes 5, for the circulating refrigerant that are fairly uniformly distributed at spaced intervals over the surface area of the freeze plate and that are formed in high thermal conductivity with the outer surface of the the freeze plate. Heat thus flows from water below the surface of the freeze plate 61 in substantially vertical direction through the layer of ice, and through the heater structure 55, 57 on the surface of the freeze plate, and (in some regions between tubes 51) along the freeze plate 61 to the tubes 51 with the circulating refrigerant therein. Heat flow along the freeze plate between tubes 51 may be slower or less efficient with higher thermal gradient per unit length than the heat flow through the ice layer and through the freeze plate 61 directly to a tube 51.

The heater structure illustrated in FIG. 10 includes the layer 55 of electrical insulation at least on the side of the electrical conductor 57 opposite the freeze plate 61. Such electrically insulating layer (typically, Kapton or Teflon polymer materials available from DuPont Co.) is also a thermal insulator which therefore decreases the rate of heat flow directly to the tubes 51 to approximately the rate of heat flow along the freeze plate between the tubes 51. This structure therefore contributes to formation of an ice layer of more uniform thickness over the surface area of the freeze plate 61 without significantly altering the overall rate of heat flow from the water to the refrigerant circulating in the tubes 51.

Second, the electrical conductor 57 in the intermediate layer of the heater structure is connected via the controller 35 to conduct current to provide Joule heating during the ice-melting period of operation previously described. This heater structure may be retained in close, continuous thermal contact with the layer of ice during the melting period by resiliently biasing the freeze plate 61 assembly into the freeze tray 23, or viceversa, in order to maintain surface contact between the heater structure and the ice layer in the freeze tray 23 as the ice layer melts.

Third, the electrical conductor 57 is connected via controller 35 to serve as one substantially equipotential electrode for establishing an electrostatic field in the impure water in freeze tray 23 during the ice formation period of operation, as previously described. Finally, the outer surface of the outer layer 55 (e.g. Teflon) of the heater structure exhibits smooth, substantially nonwetting surface characteristics which inhibits development or formation of nucleation sites as ice initially forms. These surface properties have been found to promote the formation of a more uniform layer of ice comprising substantially homogenous platelet-type crystals rather than spire-shaped crystals, with concomitant reductions of trapped impurities at dislocation sites in imperfect ice crystals.

Figure 11:
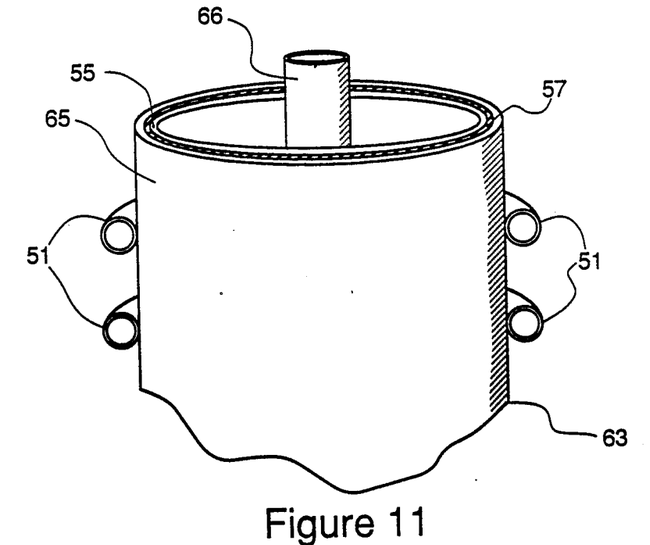
FIG. 11 is a perspective sectional view of a cylindrical vessel including an electrostatic-field structure according to the present invention.

Referring now to FIG. 11, there is shown a perspective sectional view of another embodiment of a freeze tray or vessel 63 in the structure of the present invention. Specifically, the vessel 63 is generally of cylindrical shape (i.e. right circular, or rectangular or elliptical, or the like) with thermally conductive side walls 65 forming an evaporator or freeze plate around substantially the entire perimeter, and with minimum interior dimension (e.g. diameter) selected to be larger than the thickness of the layer of ice formed adjacent the side walls. Remaining unfrozen impure water may therefore be drained from the center of the structure. An electrode 66 is substantially vertically oriented near the center of the structure for establishing an electrostatic field in the impure water during the ice formation period of operation to enhance the purity of the ice in the manner previously described. A heater structure 55, 57 similar to the one previously described in connection with freeze plate 23 may also be disposed on the interior walls of the cylindrical vessel, and the vessel may be closed at the upper end (except for air venting) in order to inhibit spills during operation in mobile environments such as in mobile homes or marine or military installations.

Figure 12:
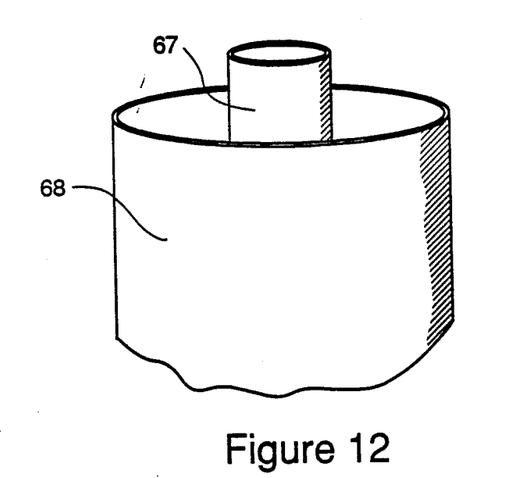
FIG. 12 is a perspective view of another embodiment of the freeze chamber according to the present invention.

Referring now to FIG. 12, there is shown a perspective sectional view of another embodiment of a freeze tray or vessel 68 in the structure of the present invention. Specifically, the vessel 63 is generally of cylindrical shape, as previously described with reference to FIG. 11, with a thermally-conductive freeze plate or tube 67 centrally disposed with the surrounding side walls 68. In this embodiment, the evaporator or freeze tube 67 includes circulating refrigerant therein for forming the layer of ice with thickness less than the dimension to the adjacent the side walls 68 of the vessel. The inner dimension of the vessel (e.g. diameter) may be at least 2.1 to 3.0 times the thickness of the ice layer (plus the outer dimension of the freeze tube 67, or electrode 66 in the embodiment of FIG. 11). The freeze tube 67 may include a non-wetting surface, as previously described. Remaining unfrozen impure water may therefore be drained from the outer region of the central layer of ice, (i.e., near the inner walls of the vessel 68). Electrodes for establishing an electrostatic field in the impure water during the ice formation period of operation to enhance the purity of the ice in the manner previously described may be disposed on the walls of the vessel 68 and on the freeze tube 67 to wage impurities away from the freeze tube 67. Heating means for melting ice formed on the freeze tube 67 may include circulating heated refrigerant therethrough, or a current-conducting electrical heater, or infrared or microwave heaters, or the like, and the vessel may be closed at the upper end (except for air venting) in order to inhibit spills during operation in mobile environments such as in mobile homes or marine or military installations.

Therefore, freeze purification of impure water can be optimized for maximum throughput at minimum cost in accordance with the method and apparatus of the present invention by taking into account the size of freeze plate and the temperature of the refrigerant circulating therein, and by the magnitude of an applied electrical potential. In addition, the surface properties of the freeze plate are selected to promote the formation of more uniform ice crystals that inhibit entrapment of impurities at the ice-water interface. Also, the surface structure of the freeze plate may be arranged and connected to exert electrostatic force on impurities during formation of the ice layer, as well as the supply Joule heating of the ice layer following removal of unfrozen, impure water.

What is claimed is:

1. Apparatus for removing impurities from impure water comprising:
    a chamber for confining a volume of water to be purified;
    heat transfer means including a freeze plate disposed to contact the surface of water within the chamber to extract heat therefrom substantially only from upper regions thereof to form a layer of ice in a volume of water adjacent the upper region of the chamber;
    circuit means disposed within the chamber to establish an electric field relative to the freeze plate for exerting electrostatic force upon impurities in water within the chamber in a direction away from the freeze plate;
    heater means disposed to melt ice within the chamber; and
    means connected to the chamber for removing water therefrom associated with melting ice therein.

2. Apparatus as in claim 1 wherein:
    said circuit means includes electrode means disposed within the chamber at a depth below the freeze plate greater than the thickness of a layer of ice disposed adjacent the freeze plate.

3. Apparatus as in claim 2 wherein:
    said circuit means energizes the electrode means with a positive potential relative to the freeze plate.

4. Apparatus for removing impurities from impure water comprising:
    a chamber having a selected depth and surface area for confining therein a volume of water to be purified;
    heat transfer means including a freeze plate having a surface area of approximately the surface area of the chamber disposed to contact the surface of water within the chamber to extract heat therefrom substantially only from upper regions thereof to form a layer of ice beneath the freeze plate and in contact therewith in a volume of water adjacent the upper region of the chamber to a depth less than the selected depth of the chamber;
    heater means disposed to melt ice within the chamber; and
    means connected to the chamber for removing water therefrom associated with melting ice therein.

5. Apparatus as in claim 4 wherein:
    said selected depth of water in the chamber below the freeze plate is in the range of 1.1 to 3.0 times greater than the thickness of the layer of ice beneath the freeze plate.

6. Apparatus for removing impurities from impure water comprising:
    a chamber for confining therein a volume of water to be purified;
    heat transfer means including a freeze plate and compressor means for circulating refrigerant therein during a freeze cycle, said freeze plate being disposed to contact the surface of water within the chamber to extract heat therefrom substantially only from upper regions thereof initially during the freeze cycle at a rate determined by the compressor means and freeze plate to form a layer of ice in contact with the freeze plate, said heat transfer means subsequently extracting heat during the freeze cycle at a rate substantially determined by the rate of thermal conduction through the layer of ice to the freeze plate;

means connected to the chamber for removing substantially all unfrozen water therefrom;
heater means disposed to melt ice within the chamber; and
means connected to the chamber for removing water therefrom associated with melting ice therein.

7. Apparatus as in claim 6 wherein:
said heat transfer means and means for removing unfrozen water and heater means and means for removing water associated with melting ice are sequentially operated recurringly; and
the surface area of the freeze plate is selected for the compressor means which circulates refrigerant therethrough at an average temperature over a freeze cycle of selected duration to produce substantially maximum volume of water from melted ice within the chamber over a plurality of recurring operations.

8. A method for removing impurities from impure water comprising the steps of:
confining a volume of water to be purified;
transferring heat from the volume of water substantially only through a boundary surface thereof to form a layer of ice in a confined volume of water;
establishing an electric field relative to the surface of the water for exerting electrostatic force upon impurities in the volume of water in a direction away from the boundary surface;
removing unfrozen water;
melting the ice; and
removing the water associated with the melting ice.

9. The method according to claim 8 wherein the step of establishing the electric field includes positioning an electrode within the volume of water at a depth below the surface of the water that is greater than the thickness of a layer of ice.

10. The method according to claim 9 wherein the electric field is established in a positive potential gradient with depth relative to the surface of the water.

11. A method for removing impurities from impure water comprising the steps of:
confining a volume of water to be purified within a selected depth and surface area;
transferring heat from the volume of water within approximately the surface area of the confined volume of water and from substantially only contact with the surface of the volume of water to extract the heat therefrom substantially only from upper regions thereof to form a layer of ice beneath the surface to a depth less than the selected depth of the volume of water;
removing substantially all the unfrozen portion of the volume of water;
melting the ice within the chamber; and
removing the water associated with the melting ice.

12. The method according to claim 11 wherein in the step of confining, the selected depth of water below the surface thereof is in the range of 1.1 to 3.0 times greater than the thickness of the layer of ice beneath the surface.

13. A method for removing impurities from impure water using refrigeration apparatus including a freeze plate and compressor means for circulating refrigerant therethrough, the method comprising the steps of:
confining a volume of water to be purified;
transferring heat from the volume of water during a freeze cycle with the freeze plate disposed in contact with the surface of the water to extract heat therefrom substantially only from upper regions thereof near the surface of the water initially during the freeze cycle at a rate determined by the compressor means and freeze plate to form a layer of ice in contact with the freeze plate, and sequentially to extract heat during the freeze cycle at a rate substantially determined by the rate of thermal conduction through the layer of ice to the freeze plate;
removing substantially all the unfrozen portion of the volume of water;
melting the ice; and
removing the water associated with melting ice.

14. The method according to claim 13 wherein the steps of transferring heat, removing unfrozen water, melting the ice, and removing water associated with melting ice are sequentially performed recurringly; and wherein
the surface area of the freeze plate is selected for the compressor means which circulates refrigerant therethrough at an average temperature over a freeze cycle of selected duration to produce substantially maximum volume of water from melted ice within the chamber over a plurality of recurring operations.

15. A method for removing impurities from impure water using refrigeration apparatus including a freeze plate and compressor means for circulating refrigerant therethrough, the method comprising the steps of:
confining a volume of water to be purified;
contacting the surface of the volume of water with the freeze plate;
circulating refrigerant through the freeze plate to transfer heat from the volume of water during a freeze cycle to extract heat therefrom substantially only from upper regions thereof near the surface of the water to form a layer of ice in contact with the freeze plate during the freeze cycle;
sensing the temperature of the refrigerant circulated through and returned from the freeze place;
terminating the freeze cycle to cease forming the layer of ice in contact with the freeze plate in response to the sensed temperature of the refrigerant decreasing to a selected value;
removing substantially all the unfrozen portion of the volume of water;
melting the ice; and
removing the water associated with melting ice.

16. A method for removing impurities from impure water using refrigeration apparatus including a freeze plate and compressor means for circulating refrigerant therethrough, the method comprising the steps of:
confining a volume of water to be purified;
contacting the surface of the volume of water with the freeze plate;
circulating refrigerant through the freeze plate to transfer heat from the volume of water during a freeze cycle to extract heat therefrom substantially only from upper regions thereof near the surface of the water to form a layer of ice in contact with the freeze plate during the freeze cycle;
sensing the temperature of water in the vessel;
sensing the temperature of the refrigerant circulated through and returned from the freeze plate;
controlling the duration of the freeze cycle to cease forming the layer of ice in response to the sensed temperature of water in the vessel and the sensed temperature of the refrigerant circulated through and returned from the freeze plate attaining selected values;

removing substantially all the unfrozen portion of the volume of water;

melting the ice; and removing the water associated with melting ice.

17. Apparatus for removing impurities from impure water comprising:

a vessel for confining a volume of water to be purified;

refrigeration means including a freeze plate and compressor means for circulating refrigerant therethrough, said freeze plate being disposed to contact the surface of water confined in said vessel;

sensing means disposed to sense the temperature of refrigerant circulated through and returned from the freeze plate;

control means coupled to the compressor means and to the sensing means for activating the compressor means to circulate refrigerant through the freeze plate to extract heat therefrom to form a layer of ice in contact therewith near the surface of a volume of water confined in said vessel, said control means being responsive to the sensing means to deactivate said compressor means in response to the sensed temperature decreasing to a selected value;

valve means coupled to the vessel and connected to be operated by the control means for draining substantially all unfrozen water from the vessel following deactivation of the compressor means;

heater means disposed to melt the layer of ice in contact with the freeze plate following operation of the valve means to drain unfrozen water from the vessel; and means coupled to the vessel for removing water associated with melting ice.

18. Apparatus for removing impurities from impure water comprising:

a vessel for confining a volume of water to be purified;

refrigeration means including a freeze plate and compressor means for circulating refrigerant therethrough, said freeze plate being disposed to contact the surface of water confined in said vessel;

first sensing means disposed to sense the temperature of water in the vessel;

second sensing means disposed to sense the temperature of refrigerant circulated through and returned from the freeze plate;

control means coupled to the compressor means and to the first and second sensing means for activating the compressor means to circulate refrigerant through the freeze plate to extract heat therefrom to form a layer of ice in contact therewith near the surface of a volume of water confined in said vessel, said control means being responsive to the first and second sensing means to deactivate said compressor means in response to the sensed temperatures decreasing to selected values;

valve means coupled to the vessel and connected to be operated by the control means for draining unfrozen water from the vessel following deactivation of the compressor means;

heater means disposed to melt the layer of ice in contact with the freeze plate following operation of the valve means to drain unfrozen water from the vessel; and means coupled to the vessel for removing water associated with melting ice.

19. Apparatus according to claim 18 wherein said control means responds to the rate of change of temperature and to the temperature sensed by said first sensing means to selectively deactivate said compressor means.

20. Apparatus for removing impurities from impure water comprising:

a chamber having cylindrical walls and having a selected depth dimension and a selected minimum interior dimension substantially normal to the depth dimension for confining therein a volume of water to be purified;

heat transfer means including a freeze plate disposed in thermal contact with the walls of the chamber to extract heat from water within the chamber substantially only through the walls thereof to form a layer of ice adjacent the freeze plate and in contact with said walls in a volume of water in the chamber to a thickness less than said minimum interior dimension of the chamber;

means connected to the chamber for removing substantially all the unfrozen water therefrom;

heater means disposed to melt ice within the chamber; and means connected to the chamber for removing water therefrom associated with melting ice therein.

21. Apparatus as in claim 20 wherein:

said selected minimum interior dimension of the chamber near the freeze plate is in the range of 2.1 to 3.0 times greater than the thickness of the layer of ice adjacent said walls.

22. Apparatus as in claim 20 for removing impurities from impure water wherein said:

heat transfer means includes said freeze plate and compressor means for circulating refrigerant therein during a freeze cycle and said freeze plate extracts heat from water within the chamber through the walls thereof initially during the freeze cycle at a rate determined by the compressor means and freeze plate to form a layer of ice in contact with the chamber walls, and said heat transfer means subsequently extracting heat during the freeze cycle at a rate substantially determined by the rate of thermal conduction through the layer of ice to the freeze plate.

23. Apparatus as in claim 22 wherein:

said heat transfer means and said means for removing unfrozen water and said heater means and said means for removing water associated with melting ice are sequentially operated recurringly; and the surface area of the walls in contact with the freeze plate is selected from the compressor means which circulates refrigerant therethrough at an average temperature over a freeze cycle of selected duration to produce substantially maximum volume of water from melted ice within the chamber over a plurality of recurring operations.

24. Apparatus for removing impurities from impure water comprising:

a chamber having cylindrical walls and having a selected depth dimension and a selected minimum interior dimension substantially normal to the depth dimension for confining therein a volume of water to be purified;

heat transfer means including a freeze plate disposed in thermal contact with the walls of the chamber to extract heat from water within the chamber substantially only through the walls thereof to form a layer of ice adjacent the freeze plate and in contact with said walls in a volume of water in the chamber to a thickness less than said minimum interior dimension of the chamber;

means connected to the chamber for removing substantially all the unfrozen water therefrom;

heater means disposed to melt ice within the chamber; and means connected to the chamber for removing water therefrom associated with melting ice therein; and circuit means including electrode means disposed substantially centrally within the chamber along the depth dimension thereof to establish an electric field relative to the walls of the chamber for exerting electrostatic force upon impurities in water within the chamber in a direction away from the walls.

25. Apparatus as in claim 24 wherein:
said electrode means is disposed within the chamber at a distance from the walls that is greater than the thickness of a layer of ice disposed adjacent the walls.

26. Apparatus as in claim 25 wherein:
said circuit means energizes the electrode means with a positive potential relative to the walls.

27. Apparatus as in claim 24 wherein:
said circuit means includes an electrical conductor disposed adjacent said walls and connectable to form a substantially equipotential surface relative to said electrode means.

28. Apparatus for removing impurities from impure water comprising:
a chamber for confining a volume of water to be purified;
heat transfer means including a freeze plate disposed to contact a boundary surface of water within the chamber to extract heat therefrom substantially only through said boundary surface to form a layer of ice in a volume of water in the chamber;
conductor means disposed intermediate the freeze plate and the boundary surface of water within the chamber and including a layer of electrical conductor and a layer of insulation, said conductor means being connectable to conduct current for supplying heat to melt ice within the chamber, and being connectable to form a substantially equipotential surface in the layer of electrical conductor;
circuit means including an electrode disposed within the chamber away from the freeze plate for establishing an electric field relative to said electrical conductor for exerting electrostatic force upon impurities in water within the chamber in a direction away from the freeze plate; and
means connected to the chamber for removing water therefrom associated with melting ice therein.

29. Apparatus as in claim 28 wherein:
said electrode is disposed within the chamber at a distance away from the freeze Plate that is greater than the thickness of a layer of ice disposed adjacent the freeze plate.

30. Apparatus as in claim 29 wherein:
said circuit means energizes the electrode means with a positive potential relative to the electrical conductor.

31. Apparatus for removing impurities from impure water comprising:

a chamber for confining a volume of water to be purified;
heat transfer means including a freeze plate disposed adjacent a boundary surface of water within the chamber to extract heat therefrom substantially only through said boundary surface to form a layer of ice in contact with the freeze plate in a volume of water adjacent the freeze plate;
conductor means disposed intermediate the freeze plate and the boundary surface of water within the chamber and including a layer of electrical conductor and a layer of insulator disposed to contact water in the chamber;
means connected to the chamber for removing substantially all unfrozen water therefrom;
circuit means connected to supply current to the electrical conductor to produce heat for melting ice in the chamber; and
means connected to the chamber for removing water therefrom associated with melting ice therein.

32. Apparatus as in claim 31 wherein:
said insulator layer includes a substantially non-wettable smooth surface.

33. Apparatus as in claim 32 wherein:
said conductor means has lower thermal conductivity therethrough than said freeze plate.

34. A method for removing impurities from impure water comprising the steps of:
confining a volume of water to be purified;
establishing a boundary layer in contact with a surface of the volume of water;
transferring heat from the volume of water substantially only through the boundary layer to form a layer of ice in a volume of water adjacent the boundary layer of the chamber;
removing substantially all the unfrozen portion of the volume of water;
producing heat in the boundary layer for melting the ice; and
removing the water associated with the melting ice.

35. The method according to claim 34 wherein in the step of producing heat, electric current is conducted within the boundary layer to produce heat for melting the ice.

36. The method according to claim 34 wherein the step of establishing a boundary layer includes forming a smooth, substantially non-wetting surface in contact with the water.

37. A method for removing impurities from unpure water comprising the steps of:
confining a volume of water to be purified;
establishing a boundary layer in contact with a surface of the volume of water;
transferring heat from the volume of water substantially only through the boundary layer to form a layer of ice in a volume of water adjacent the boundary layer of the chamber;
establishing an electric field relative to the boundary layer for exerting electrostatic force upon impurities in the volume of water in a direction away from the boundary layer;
removing unfrozen water;
produces heat in the boundary layer for melting the ice; and
removing the water associated with the melting ice.

38. Apparatus according to claim 4 wherein said heater means is disposed in the freeze plate to melt ice adjacent the freeze plate.

39. Apparatus according to claim 38 comprising:

means disposed to resiliently urge the freeze plate and layer of ice into intimate surface engagement during said melting of ice within the chamber.

40. Apparatus according to claim 7 wherein said heater means is disposed in said freeze plate; and comprising means disposed to resiliently urge the freeze plate and layer of ice into intimate surface engagement during said melting of ice within the chamber.

41. The method according to claim 11 wherein the step of melting the ice includes heating a surface adjacent the layer of ice and resiliently urging the ice into surface engagement during melting of the ice.

42. The method according to claim 15 wherein the step of melting the ice includes heating the surface of the freeze plate, and resiliently urging the layer of ice into surface engagement with the heated surface of the freeze plate.

43. Apparatus for removing impurities from impure water comprising:

a chamber having substantially cylindrical walls and having a selected depth dimension and a selected minimum interior dimension substantially normal to the depth dimension for confining therein a volume of water to be purified;

heat transfer means including a freeze tube disposed within with the walls of the chamber to extract heat from water within the chamber substantially only through the walls thereof to form a layer of ice adjacent the freeze tube in a volume of water in the chamber to a thickness less than said minimum interior dimension of the chamber;

means connected to the chamber for removing substantially all unfrozen water therefrom;

heater means disposed to melt ice within the chamber; and means connected to the chamber for removing water therefrom associated with melting ice therein.

44. Apparatus as in claim 43 wherein:

said selected minimum interior dimension of the chamber to the freeze tube is in the range of 2.1 to 3.0 times greater than the thickness of the layer of ice adjacent said freeze tube.

45. Apparatus as in claim 43 for removing impurities from impure water wherein said:

heat transfer means includes said freeze tube and compressor means for circulating refrigerant therein during a freeze cycle, and said freeze tube extracts heat from water within the chamber through the walls of the freeze tube initially during the freeze cycle at a rate determined by the compressor means and freeze tube to form a layer of ice in contact with the surface of the freeze tube, and said heat transfer means subsequently extracting heat during the freeze cycle at a rate substantially determined by the rate of thermal conduction through the layer of ice to the freeze tube.

46. Apparatus as in claim 45 wherein:

said heat transfer means and said means for removing unfrozen water and said heater means and said means for removing water associated with melting ice are sequentially operated recurringly; and the surface area of the freeze tube is selected for the compressor means which circulates refrigerant therethrough at an average temperature over a freeze cycle of selected duration to produce substantially maximum volume of water from melted ice within the chamber over a plurality of recurring operations.

47. Apparatus as in claim 43 for removing impurities from impure water wherein:

said freeze tube is disposed substantially centrally within the chamber along the depth dimension for circulating refrigerant therein to extract heat from water within the chamber to form a layer of ice that increases in thickness during a freeze cycle toward the walls of the chamber.

48. Apparatus according to claim 47 comprising a layer on said freeze tube of substantially non-wetting material disposed to contact water in the chamber.

49. A method for removing impurities from impure water confined within a vessel using refrigeration apparatus including a freeze tube and compressor means for circulating refrigerant therethrough, the method comprising the steps of:

confining a volume of water to be purified within the vessel to a selected depth;

contacting a boundary surface of the volume of water with the freeze tube at a position within the vessel;

circulating refrigerant through the freeze tube to transfer heat from the volume of water during a freeze cycle to extract heat therefrom substantially only through said boundary surface to form a layer of ice in contact with the freeze tube during the freeze cycle;

sensing the temperature of the refrigerant circulated through and returned from the freeze tube;

terminating the freeze cycle to cease forming the layer of ice in contact with the freeze tube in response to the sensed temperature of the refrigerant decreasing to a selected value;

removing the unfrozen portion of the volume of water within the vessel;

melting the ice; and removing the water associated with melting ice.

50. The method according to claim 49 wherein the step of melting includes heating the surface of the freeze tube to melt the ice in contact therewith.

51. The method according to claim 49 wherein the surface of the freeze tube forming a boundary surface with water in the vessel includes non-wetting material.

* * * * *